(12) United States Patent
Hasegawa et al.

(10) Patent No.: US 10,505,229 B2
(45) Date of Patent: Dec. 10, 2019

(54) ENERGY STORAGE DEVICE, ENERGY STORAGE APPARATUS, AND AUTOMOBILE

(71) Applicant: GS Yuasa International Ltd., Kyoto-shi, Kyoto (JP)

(72) Inventors: Hidefumi Hasegawa, Kyoto (JP); Kie Tanaka, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 38 days.

(21) Appl. No.: 15/550,985

(22) PCT Filed: Feb. 16, 2016

(86) PCT No.: PCT/JP2016/054461
§ 371 (c)(1),
(2) Date: Aug. 14, 2017

(87) PCT Pub. No.: WO2016/133095
PCT Pub. Date: Aug. 25, 2016

(65) Prior Publication Data
US 2018/0034098 A1    Feb. 1, 2018

(30) Foreign Application Priority Data
Feb. 17, 2015   (JP) .................................. 2015-028858

(51) Int. Cl.
*H01M 10/05*        (2010.01)
*H01M 2/16*         (2006.01)
(Continued)

(52) U.S. Cl.
CPC .......... *H01M 10/058* (2013.01); *H01G 11/12* (2013.01); *H01G 11/26* (2013.01);
(Continued)

(58) Field of Classification Search
None
See application file for complete search history.

(56) References Cited

U.S. PATENT DOCUMENTS 8,709,639 B2 *   4/2014   Kim ................... H01M 2/0202
                                                          429/131
2007/0154790 A1   7/2007   Jeung
(Continued)

FOREIGN PATENT DOCUMENTS

JP        2009522744         6/2009
JP       2011216399 A2      10/2011
(Continued)

OTHER PUBLICATIONS

WO-2005/067080-A1 English machine translation (Year: 2005).*
International Search Report dated May 24, 2016 filed in PCT/JP2016/054461.

*Primary Examiner* — Scott J. Chmielecki
(74) *Attorney, Agent, or Firm* — Rankin, Hill & Clark LLP

(57) ABSTRACT

The energy storage device of the present invention includes: a negative electrode including a negative composite layer and a composite layer non-forming portion on both surfaces of a negative electrode current collecting foil respectively; a positive electrode including a positive composite layer on both surfaces of a positive electrode current collecting foil respectively; and a separator including an insulation layer which faces the positive electrode and is interposed between the negative electrode and the positive electrode. The negative electrode, the separator and the positive electrode are stacked in a first direction. The negative composite layer and the composite layer non-forming portion are disposed adjacently to each other in a second direction orthogonal to the first direction on the respective surfaces of the negative electrode. The separator is configured to project in the (Continued)

second direction from the positive composite layer at one end of the separator in the second direction. The separator contains a first bent portion including a recessed surface on a surface thereof which faces the negative electrode at a portion projecting in the second direction from the negative composite layer. The first bent portions of the separators disposed adjacently to each other in the first direction are brought into contact with each other.

11 Claims, 8 Drawing Sheets

(51) Int. Cl.
  *H01M 4/13* (2010.01)
  *H01G 11/52* (2013.01)
  *H01M 10/058* (2010.01)
  *H01G 11/26* (2013.01)
  *H01G 11/74* (2013.01)
  *H01M 2/18* (2006.01)
  *H01M 10/04* (2006.01)
  *H01M 10/0585* (2010.01)
  *H01G 11/12* (2013.01)
  *H01G 11/70* (2013.01)
  *H01G 11/72* (2013.01)
  *H01G 11/76* (2013.01)
(52) U.S. Cl.
  CPC ............ *H01G 11/52* (2013.01); *H01G 11/70* (2013.01); *H01G 11/72* (2013.01); *H01G 11/74* (2013.01); *H01G 11/76* (2013.01); *H01M 2/16* (2013.01); *H01M 2/1673* (2013.01); *H01M 2/18* (2013.01); *H01M 4/13* (2013.01); *H01M 10/0413* (2013.01); *H01M 10/0585* (2013.01); *H01M 2220/20* (2013.01)

(56) References Cited

U.S. PATENT DOCUMENTS

| 2011/0097622 | A1* | 4/2011 | Kim ..................... | H01M 2/0202 |
| | | | | 429/163 |
| 2014/0045032 | A1* | 2/2014 | Tanaka ................ | H01M 10/045 |
| | | | | 429/144 |
| 2014/0087222 | A1* | 3/2014 | Yamane .............. | H01M 2/1673 |
| | | | | 429/94 |
| 2014/0205886 | A1* | 7/2014 | Sakaguchi .......... | H01M 2/1646 |
| | | | | 429/149 |
| 2014/0356695 | A1* | 12/2014 | Abe ...................... | H01M 4/131 |
| | | | | 429/163 |
| 2014/0370361 | A1* | 12/2014 | Cheong ............... | H01M 2/1686 |
| | | | | 429/144 |
| 2016/0197372 | A1 | 7/2016 | Sawada | |

FOREIGN PATENT DOCUMENTS

| JP | 2012043752 | | 3/2012 | |
| JP | 2012199020 | A2 | 10/2012 | |
| JP | 2014017159 | | 1/2014 | |
| JP | 2014071952 | A2 | 4/2014 | |
| JP | 2014082070 | A2 | 5/2014 | |
| JP | 2014082193 | A2 | 5/2014 | |
| JP | 2014110160 | A2 | 6/2014 | |
| JP | 2014139885 | A2 | 7/2014 | |
| JP | 2014207205 | A2 | 10/2014 | |
| JP | 2015135734 | A2 | 7/2015 | |
| WO | WO-2005067080 | A1 * | 7/2005 | ............. H01M 2/16 |
| WO | 2014103594 | A1 | 7/2010 | |

* cited by examiner

ENERGY STORAGE DEVICE, ENERGY STORAGE APPARATUS, AND AUTOMOBILE

TECHNICAL FIELD

The present invention relates to an energy storage device equipped with a separator having an insulation layer on a surface thereof, and an energy storage apparatus and an automobile which use such an energy storage device.

BACKGROUND ART

Conventionally, there has been known an energy storage device which includes an electrode assembly formed of: a positive electrode having a positive composite layer and a positive composite layer non-forming portion; a negative electrode having a negative composite layer and a negative composite layer non-forming portion; and a separator interposed between the positive electrode and the negative electrode, wherein the positive composite layer non-forming portion and the negative composite layer non-forming portion are made to project in directions opposite to each other.

A material (for example, polypropylene, polyethylene or the like) used for forming the separator is shrunken to some extent due to heat. Accordingly, to prevent short circuit between the positive electrode and the negative electrode caused by thermal shrinking of the separator, separator is disposed such that the separator projects longer than edge portions of the positive composite layer and the negative composite layer.

Patent document 1 discloses a secondary battery having the following configuration (paragraphs 0010, 0027 and the like). By focusing on a phenomenon that when heat generated by an overcharge or the like is accumulated in the secondary battery, a temperature of a positive electrode non-coated portion side is liable to be higher than a temperature of a negative electrode non-coated portion side, a projecting amount of a separator on the positive electrode non-coated portion side is set twice or more as large as a projecting amount of the separator on the negative electrode non-coated portion side so that short circuit can be properly prevented even when the temperature is elevated.

PRIOR ART DOCUMENT

Patent Document

Patent Document 1: JP-A-2012-043752

SUMMARY OF THE INVENTION

Problems to be Solved by the Invention

Inventors of the present invention proposes a novel technique which suppresses lowering of capacity of an energy storage device even in the case where metal powder is mixed into the energy storage device due to a ordinarily unforeseeable cause in a process of manufacturing the energy storage device.

The inventors of the present invention have found that a separator having an insulation layer on a surface of the separator on one side is bent with the surface having the insulation layer projecting in a lateral direction (TD direction) perpendicular to a longitudinal direction (MD direction). The inventors of the present invention have made study extensively based on this finding, and have completed the present invention.

It is an object of the present invention to provide an energy storage device which can suppress movement (flow) of metal powder to a positive electrode even when the metal powder is mixed into the energy storage device due to an ordinarily unforeseeable cause, and energy storage apparatus and an automobile which use such an energy storage device.

Means for Solving the Problems

An energy storage device comprising:
a negative electrode having a negative composite layer and a composite layer non-forming portion on both surfaces of a negative electrode current collecting foil respectively;
a positive electrode having a positive composite layer on both surfaces of a positive electrode current collecting foil respectively; and
a separator having an insulation layer which faces the positive electrode and is interposed between the negative electrode and the positive electrode, wherein
the negative electrode, the separator and the positive electrode are stacked in a first direction,
the negative composite layer and the composite layer non-forming portion are disposed adjacently to each other in a second direction orthogonal to the first direction on the respective surfaces of the negative electrode,
the separator is configured to project in the second direction from the positive composite layer at one end of the separator in the second direction,
the separator has a first bent portion having a recessed surface on a surface thereof which faces the negative electrode at a portion projecting in the second direction from the positive composite layer, and
the first bent portions of the separators disposed adjacently to each other in the first direction are brought into contact with each other.

According to the first aspect of the present invention, even when metal powder is mixed into an energy storage device due to a ordinarily unforeseeable cause, the movement (the flow) of the metal powder to the positive electrode can be suppressed and hence, it is possible to suppress lowering of a minute amount of capacity caused by a minute short-circuit of the energy storage device attributed to the metal powder.

Advantages of the Invention

According to the present invention, it is possible to suppress lowering of capacity of an energy storage device.

MODE FOR CARRYING OUT THE INVENTION

Hereinafter, embodiments of the present invention are described with reference to the drawings. In these embodiments, the present invention is applied to a lithium ion battery which is a nonaqueous electrolyte battery which is an energy storage device.

<First Embodiment>

An energy storage device 1 according to a first embodiment is described with reference to FIG. 1 to FIG. 7.

Figure 1:
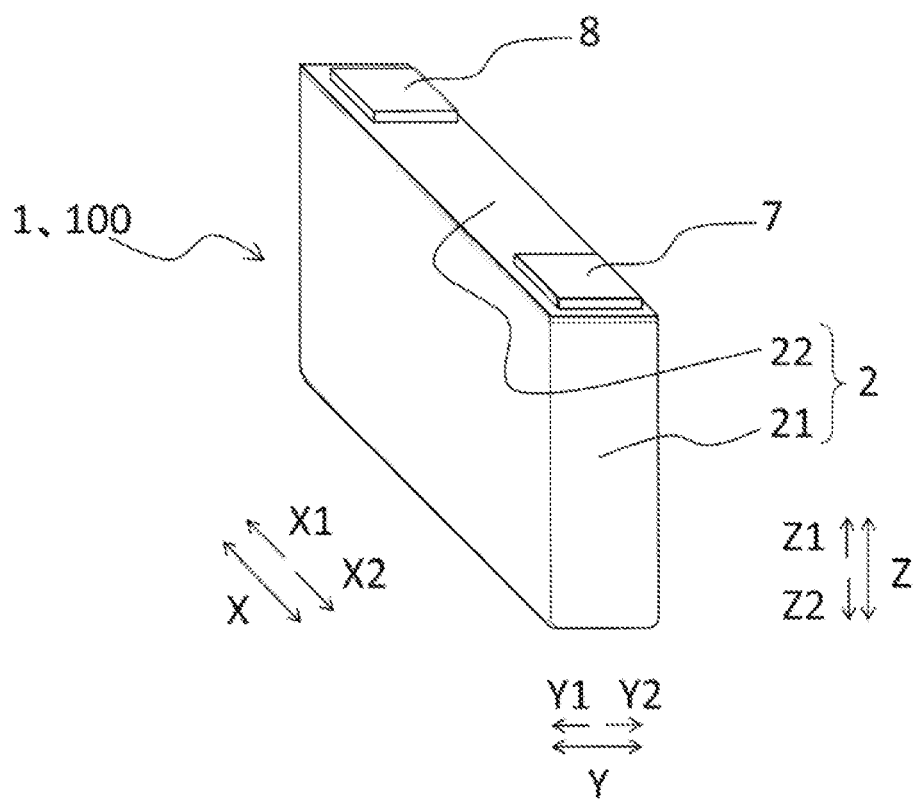
FIG. 1 is a perspective view showing an energy storage device according to a first embodiment.

The energy storage device 1 shown in FIG. 1 is a nonaqueous electrolyte battery, and more specifically is a lithium ion battery. The energy storage device 1 is mounted on an automobile such as an electric car or a hybrid automobile, for example, and supplies electricity to a power source operated by electric energy.

Figure 2:
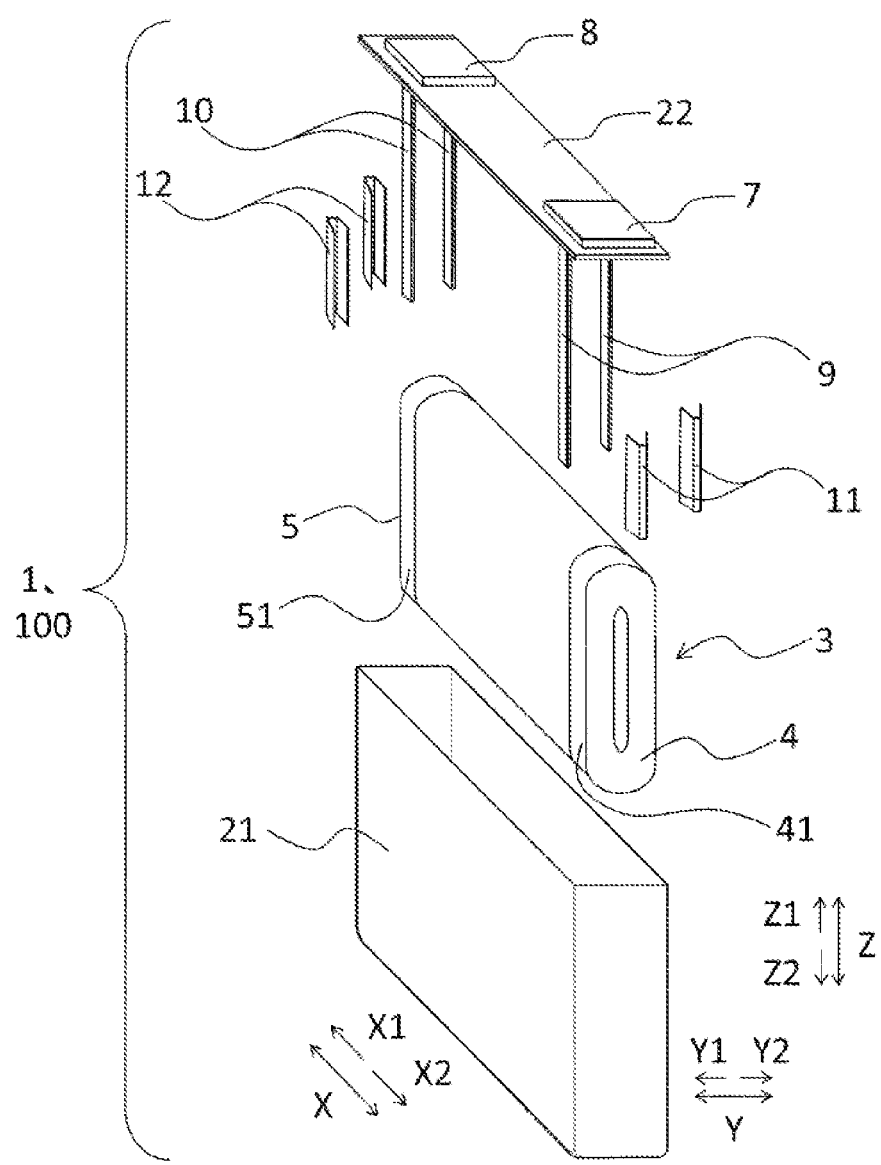
FIG. 2 is an exploded perspective view showing the energy storage device according to the first embodiment.

As shown in FIG. 2, the energy storage device 1 is configured such that an energy storage element 3 is accommodated in an outer casing 2 together with a nonaqueous electrolyte not shown in the drawing. The electrolyte may be an electrolytic solution or a solid electrolyte.

The outer casing 2 includes a case body 21 and a lid body 22. The case body 21 has an approximately rectangular parallelepiped shape as a whole, and an opening portion is formed on an upper end surface side of the case body 21. The case body 21 can be made of metal such as aluminum or an aluminum alloy, for example. The case body 21 has a bottom wall and four side walls raised from side edges of the bottom wall.

The opening portion has an elongated rectangular shape where a width size in an X direction is larger than a width size in a Y direction which is a direction orthogonal to the X direction. The energy storage element 3 is housed in the case body 21, and the case body 21 is filled with a nonaqueous electrolyte. The energy storage element 3 is housed in the case body 21 in a posture where the longitudinal direction of the case body 21 agrees with the longitudinal direction of the energy storage element 3. As will be described later, the energy storage element 3 is formed by interposing separators 6 between a positive electrode 4 and a negative electrode 5 and by winding the positive electrode 4, the negative electrode 5 and the separator 6 about a winding axis U in an approximately elongated circular shape. In the negative electrode 5, a negative composite layer non-forming portion 51 projects toward an X1 direction side from a first end portion of the separator 6 (one end of the separator 6 in a direction orthogonal to a direction that the negative electrode 5, the separators 6 and the positive electrode 4 are stacked). In the positive electrode 4, a positive composite layer non-forming portion 41 projects toward an X2 direction side from a second end portion of the separator 6 (the other end of the separator 6 in the above-mentioned direction).

A positive electrode terminal 7, a negative electrode terminal 8, positive electrode current collectors 9 and negative electrode current collectors 10 are mounted on the lid body 22. The lid body 22 has an approximately rectangular shape as a whole, and has substantially the same shape as the opening portion of the case body 21. The lid body 22 is joined to the case body 21 so as to close the opening portion of the case body 21. The lid body 22 can be made of metal such as aluminum or an aluminum alloy, for example.

The positive electrode terminal 7 and the negative electrode terminal 8 are disposed on an outer surface of the lid body 22, that is, an upper surface of the lid body 22. To be more specific, the positive electrode terminal 7 is disposed on an X2 direction side in the X direction (longitudinal direction) of the lid body 22, and the negative electrode terminal 7 is disposed on an X1 direction side in the X direction (longitudinal direction) of the lid body 22.

Two positive electrode current collectors 9 extending downward from a lower surface of the lid body 5 are electrically connected to the positive electrode terminal 7.

The positive electrode current collectors 9 respectively have an elongated shape such that the positive electrode current collectors 9 extend along a positive composite layer non-forming portion 41 (a portion where a positive electrode current collecting foil is exposed) of the positive electrode 4 described later. Two positive electrode current collectors 9 are disposed such that respective plate surfaces of the positive electrode current collectors 9 face each other. The positive electrode current collectors 9 are formed using a conductive material. For example, the positive electrode current collectors 9 can be formed using an aluminum alloy plate or the like.

The positive composite layer non-forming portion 41 is, as shown in FIG. 2, sandwiched by clips 11 together with the positive electrode current collectors 9 so that the positive composite layer non-forming portion 41 is electrically connected to the positive electrode current collectors 9. It is preferable that the clips 11 be formed using a material having substantially the same resistance value as materials for forming the positive electrode current collectors 9 and the positive composite layer non-forming portion 41 connected to the clips 11. The clips 11 can be formed using an aluminum alloy or the like, for example.

Two negative electrode current collectors 10 extending downward from a lower surface of the lid body 5 are electrically connected to the negative electrode terminal 8.

The negative electrode current collectors 10 respectively have an elongated shape such that the negative electrode current collectors 10 extend along a negative composite layer non-forming portion 51 (a portion where a negative electrode current collecting foil is exposed) of the negative electrode 5 described later. Two negative electrode current collectors 10 are disposed such that respective plate surfaces of the negative electrode current collectors 10 face each other. The negative electrode current collectors 10 are formed using a conductive material. For example, the negative electrode current collectors 10 can be formed using a copper alloy plate or the like.

The negative composite layer non-forming portion 51 is, as shown in FIG. 2, sandwiched by clips 12 together with the negative electrode current collectors 10 so that the negative composite layer non-forming portion 51 is electrically connected to the negative electrode current collectors 10. It is preferable that the clips 12 be formed using a material having substantially the same resistance value as materials for forming the negative electrode current collectors 10 and the negative composite layer non-forming portion 51 connected to the clips 12. The clips 12 can be formed using a copper alloy or the like, for example.

Figure 3:
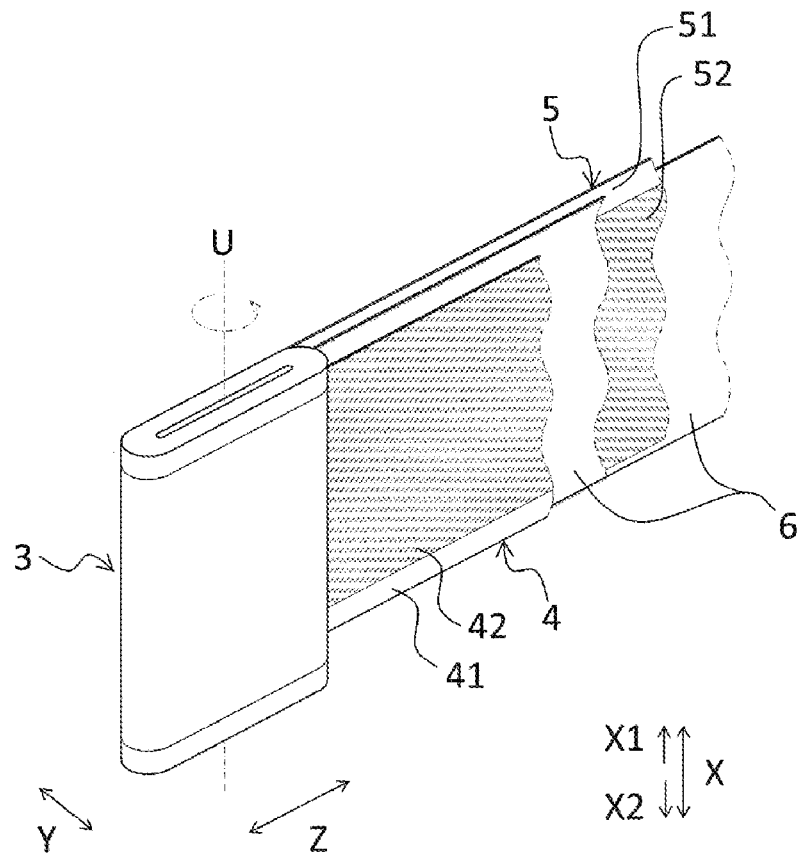
FIG. 3 is an exploded perspective view showing an energy storage element in the energy storage device according to the first embodiment.
Figure 4:
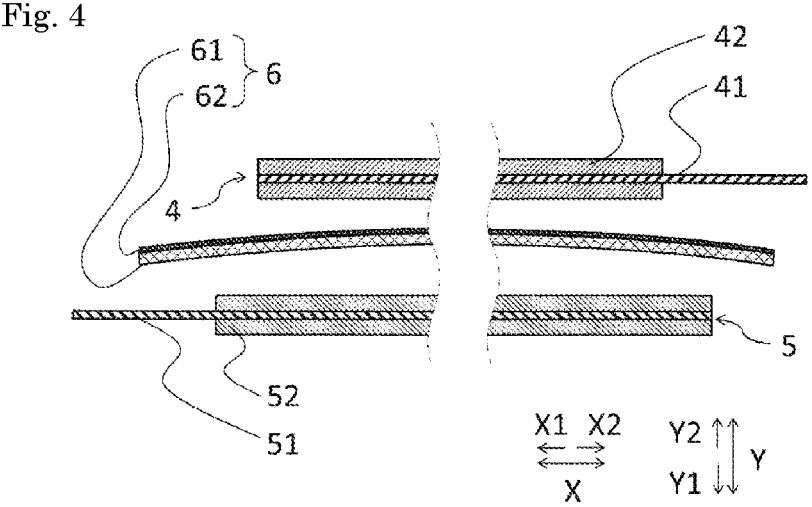
FIG. 4 is a view showing a mode in which a positive electrode and a negative electrode are disposed in a spaced-apart manner with a fixed distance with a separator interposed between the positive electrode and the negative electrode.
Figure 5:
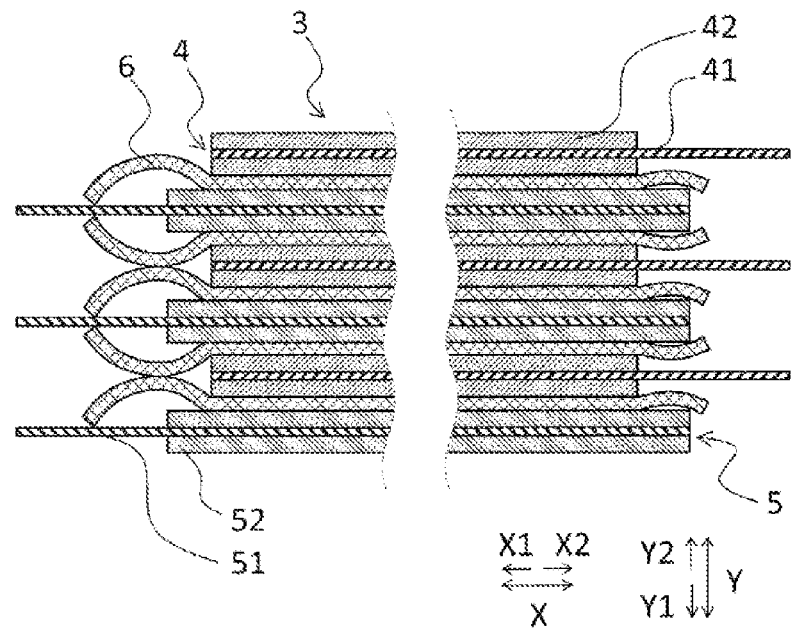
FIG. 5 is a cross-sectional view of the energy storage element of the energy storage device according to the first embodiment taken along an X-Y plane.

As shown in FIG. 3 to FIG. 5, the positive electrode 4 includes: a positive electrode current collecting foil formed of an aluminum alloy foil or the like; and the positive composite layer 42 which is disposed on a surface of the positive electrode current collecting foil and contains a positive active material. The positive active material is not particularly limited, and various positive active materials can be used.

The positive electrode 4 has a positive composite layer 42 and a positive composite layer non-forming portion 41 on both surfaces of the positive electrode current collecting foil respectively. A portion of the positive composite layer non-forming portion 41 projects from the second end portion of the separator 6 in the X2 direction (the direction orthogonal to the direction that the negative electrode 5, the separators 6 and the positive electrode 4 are stacked), and the positive composite layer 42 and the positive composite layer non-forming portion 41 are disposed adjacently to each other in the X2 direction on respective surfaces of the positive electrode 4. A width in the Y direction of the positive electrode 4 at a portion where the positive composite layer 42 and the positive electrode current collecting foil overlap with each other is an average thickness of the positive electrode 4, and a half of the average thickness of the positive electrode 4 is set as P (see FIG. 7).

As shown in FIG. 3 to FIG. 5, the negative electrode 5 includes: a negative electrode current collecting foil formed of a copper alloy foil or the like; and the negative composite layer 52 which is disposed on a surface of the negative electrode current collecting foil and contains a negative electrode active material. The negative active material is not particularly limited, and various negative active materials can be used.

The negative electrode 5 has a negative composite layer 52 and a negative composite layer non-forming portion 51 on both surfaces of the negative electrode current collecting foil respectively. A portion of the negative composite layer non-forming portion 51 projects from the first end portion of the separator 6 in the X1 direction (the direction orthogonal to the direction that the negative electrode 5, the separators 6 and the positive electrode 4 are stacked), and the negative composite layer 52 and the negative composite layer non-forming portion 51 are disposed adjacently to each other in the X1 direction on respective surfaces of the negative electrode 5. A width in the Y direction of the negative electrode 5 at the negative composite layer 52 is an average thickness of the negative composite layer 52, and an average thickness of the negative composite layer 52 is set as n (see FIG. 7).

In the X direction, a width of the negative composite layer 52 is greater than a width of the positive composite layer 42. Both end portions of the negative composite layer 52 in the X direction are formed so as to extend toward the outside of both end portions of the positive composite layer 42 in the X direction.

The separator 6 is disposed between the positive electrode 4 and the negative electrode 5. In the X direction, a width of the separator 6 is greater than a width of the composite layer 42 and a width of the negative composite layer 52. Both end portions of the separator 6 in the X direction are formed so as to extend toward the outside of both end portions of the positive composite layer 42 and the negative composite layer 52 in the X direction respectively. That is, the separator 6 projects from the positive composite layer 42 and the negative composite layer 52 in the X direction at both ends of the separator 6 in the X direction.

An end portion of the separator 6 in the X1 direction (direction that the negative composite layer non-forming portion 51 projects) is the first end portion of the separator 6. The first end portion of the separator 6 is, in the X1 direction, disposed such that the first end portion of the separator 6 projects toward the outside of the respective end portions of the positive composite layer 42 and the negative composite layer 52 in the X1 direction, and a projecting amount of the separator 6 from the end portion of the positive composite layer 42 in the X1 direction to the first end portion (one end) of the separator 6 is set as W1.

An end portion of the separator 6 in the X2 direction (direction that the positive composite layer non-forming portion 41 projects) is the second end portion of the separator 6. The second end portion of the separator 6 is, in the X2 direction, disposed such that the second end portion of the separator 6 projects toward the outside of the respective end portions of the positive composite layer 42 and the negative composite layer 52 in the X2 direction, and a projecting amount of the separator 6 from the end portion of the positive composite layer 42 in the X2 direction to the second end portion of the separator 6 is set as W2.

As shown in FIG. 4, the separator 6 includes a base material 61 formed of a fine porous film or an unwoven fabric having an insulating property, and an insulation layer 62 is formed on a surface of the base material 61 which faces the positive electrode 4. A mode is described in FIG. 4 where the positive electrode 4 and the negative electrode 5 are disposed in a spaced-apart manner with a fixed distance in a state where the separator 6 is interposed between the positive electrode 4 and the negative electrode 5. The insulating layer 62 of the separator 6 is omitted in FIG. 3 and FIG. 5 to FIG. 10.

The base material 61 of the separator 6 is not particularly limited provided that the base material 61 has an insulating property. A fine porous film, an unwoven fabric or the like can be used as the base material 61. As a material for forming the base material 61, for example, a polyolefin resin such as polyethylene or polypropylene can be named. These materials may be used singularly or two or more kinds of these materials may be used in combination.

The insulation layer 62 formed on the surface of the base material 61 which faces the positive electrode 4 can be formed by coating a slurry for forming an insulation layer which contains inorganic particles, a binder and a solvent and by drying the slurry.

A binder used for forming the insulation layer 62 plays a role of binding inorganic particles to each other and binding inorganic particles and the base material 61 to each other. As the binder, it is possible to use a solvent-based binder such as poly vinylidene fluoride (PVdF) or polytetrafluoroethylene (PTFE), a water-based binder such as a styrene-butadiene rubber (SBR) or the like. Among these binders, one kind of binder may be used singularly or two or more kinds of binders may be used in combination.

The content of a binder in the insulation layer 62 is not particularly limited provided that the content of the binder falls within a range where the binder can bind inorganic particles to each other and also can bind inorganic particles and the base material 61 to each other. However, it is preferable that a total amount of the binder with respect to the total amount of inorganic particles and the binder be 50 mass % or less. It is more preferable that the total amount of the binder be 20 mass % or less. It is still more preferable that the total amount of the binder be 10 mass % or less. It is preferable that the total amount of the binder with respect to the total amount of the inorganic particles and the binder be 0.1 mass % or more. It is more preferable that the total amount of the binder be 1 mass % or more. It is still more preferable that the total amount of the binder be 2 mass % or more.

Inorganic particles used in the insulation layer 62 are not particularly limited. As the inorganic particles, for example, it is possible to use any one selected from a group consisting of: oxide-based ceramics such as silica, alumina, boehmite, titania, zirconia, magnesia, yttria, or zinc oxide; nitride-based ceramics such as silicon nitride, titanium nitride or boron nitride; ceramics such as silicon carbide, calcium carbonate, aluminum sulfate, aluminum hydroxide, kaolin clay, kaolinite or calcium silicate; glass fibers and the like. Among these inorganic particles, one kind of inorganic particles may be used singularly or two or more kinds of inorganic particles may be used in combination.

An average particle size of inorganic particles is not particularly limited provided that the inorganic particles can be dispersed by a binder and can be bonded to predetermined portions. However, it is preferable that the average particle size of inorganic particles be 20 µm or less. It is more preferable that the average particle size of inorganic particles be 10 µm or less. It is still more preferable that the average particle size of inorganic particles be 5 µm or less. It is preferable that the average particle size of inorganic particles be 0.01 µm or more. It is more preferable that the average particle size of inorganic particles be 0.1 µm or more. It is still more preferable that the average particle size of inorganic particles be 0.5 µm or more. The "average particle size" indicates a particle size at which cumulative distribution in particle size distribution based on volume becomes 50% (D50).

The content of inorganic particles in the insulation layer 62 is not particularly limited and is suitably set. However, it is preferable that the content of inorganic particles be 99.9 mass % or less with respect to a total amount of the inorganic particles and a binder. It is more preferable that the content of the inorganic particles be 99 mass % or less. It is still more preferable that the content of the inorganic particles be 98 mass % or less. It is further still more preferable that the content of the inorganic particles be 95 mass % or less. It is preferable that the content of the inorganic particles with respect to the total amount of the inorganic particles and the binder be 50 mass % or more. It is more preferable that the content of the inorganic particles be 80 mass % or more. It is still more preferable that the content of the inorganic particles be 90 mass % or more.

The separator 6 is formed such that the insulation layer 62 is formed on a surface of the base material 61. Accordingly, even when a manner of use of the energy storage device falls outside a range of an ordinarily foreseeable manner of use so that, for example, the energy storage device generates heat abnormally and a resin material contained in the base material 61 thermally shrinks, the insulation layer 62 remains as it is so that it is possible to prevent a positive electrode and a negative electrode from being electrically brought into contact with each other.

The inventors of the present invention have found that, as shown in FIG. 4, the separator 6 is slightly bent so as to project toward a side where the insulation layer 62 is formed (Y2 direction side) in the X direction thus being regarded as an arc (a part of circle). Although the reason is uncertain, it is considered that since the insulation layer 62 is formed on the base material 61 of the separator 6 at both end portions of the base material 61 in the X direction, a stress is applied toward an X1 direction on an end portion of the base material 61 in the X1 direction, and a stress is applied toward the X2 direction on an end portion of the base material 61 in the X2 direction.

The separator 6 is slightly bent so as to project toward the side (Y2 direction side) where the insulation layer 62 is formed in the X direction thus forming the arc, and a radius of a circle which is formed by the arc is set as r.

That is, when a value of the radius r is large, the curvature of the separator 6 on the X-Y plane becomes small, and when a value of the radius r is small, the curvature of the separator 6 on the X-Y plane becomes large.

It is considered that a value of the radius r can be suitably varied corresponding to a physical property of the base material 61 of the separator 6 (tensile strength, porosity or the like), a property and a content of the binder contained in the insulation layer 62, a shape, a particle size, a content of an inorganic particle contained in the insulation layer 62 and the like. That is, it is considered that a value of the radius r is varied corresponding to a kind of the separator 6, and is a value intrinsic to the separator 6.

In the present invention, a radius (r) intrinsic to the separator 6 is calculated based on the following method. That is, a radius r described in FIG. 7 indicates a value calculated based on the following method.

First, a rectangular piece having a length of 100 mm in the longitudinal direction (MD direction) and having a length of 6 mm in the lateral direction (TD direction) perpendicular to the MD direction is cut out from the cleaned separator 6, and the cut piece is assumed as a separator piece. In the separator piece which is cut out from the separator 6, a side extending in the longitudinal direction of the separator 6 and having a length of 100 mm is assumed as a long side of the separator piece, and a side extending in the lateral direction of the separator 6 and having a length of 6 mm is assumed as a short side of the separator piece.

Next, the separator piece is placed on a measuring stage of an optical microscope with a surface thereof on which the insulation layer 62 is formed up. When the separator piece is disposed in a state where no load is applied to the separator piece (for example, in a state where the separator piece is not pressed), the separator piece is disposed in a slightly bending manner so as to project toward a side where the insulation layer 62 is formed (a state where the separator piece forms an arc). That is, by measuring the short side at the center portion of the long side of the separator piece in a state where no load is applied to the separator piece (in a state where the separator piece is not pressed), a length (d) of a chord of the arc can be obtained.

Further, when the separator piece is disposed in a state where a load is applied to the separator piece (for example, in a state where a slide glass is placed on the separator piece so that the separator 6 is pressed), the separator piece is disposed in a state where the short side of the separator piece which is bent such that the surface where the insulation layer 62 is formed is formed into a projecting shape is pressed. That is, by measuring the short side at the center portion of the long side of the separator piece in a state where a load is applied to the separator piece (in a state where the separator piece is pressed), a length (l) of the arc can be obtained. The length (l) of the arc which is obtained by using the optical microscope is set to a value substantially equal to a length (6 mm) of the short side of the separator piece at the time of cutting out the separator piece from the separator 6.

A magnification of the optical microscope is preferably set to a magnification with which the whole short side of the separator piece can be observed, for example, the magnification is preferably set to 30 times.

As described above, a radius of an arc which is formed by the separator 6 is calculated based on the length (d) of the chord of the arc and the length (l) of the arc obtained from the separator piece. To be more specific, the radius of the arc is calculated using the following formula (A) and formula (B). In the formula (A) and the formula (B), a chord (d) of the arc, a length (l) of the arc, a center angle (θ) of the arc, and a radius (r) of the arc are used.

$$d = 2r \cdot \sin(\theta/2) \quad (A)$$

$$l = r \cdot \theta \quad (B)$$

The center angle (θ) of the arc is obtained from the formula (A). Then, by substituting the length (l) of the arc and the center angle (θ) of the arc obtained by the formula (A) into the formula (B) and by developing the formula (B) with respect to the radius (r) of the arc, a radius of an arcuate shape formed by the separator 6 can be calculated. A radius of an arcuate shape formed by the separator 6 according to the present invention indicates a value of the radius (r) of the arc which is obtained by the above-mentioned method.

From the separator 6 which can be obtained by disassembling the energy storage device 1 after the energy storage device 1 is manufactured, a radius of an arcuate shape which is formed by the separator 6 according to the present invention can be obtained. First, the separator 6 is taken out from the energy storage device 1 by disassembling the energy storage device 1. The taken-out separator 6 is cleaned by using an organic solvent (for example, dimethyl carbonate (DMC)) so that an electrolyte adhered to the separator 6 is washed away, and the cleaned separator 6 is dried. A drying condition is not particularly limited provided that a drying temperature is within a temperature range where the thermal shrinking is not generated in the separator, and the separator 6 can be dried by holding the separator 6 which is cleaned by using an organic solvent in a vacuum for 12 hours at 25° C. Next, a rectangular parallelepiped piece having a length of 100 mm in the longitudinal direction (MD direction) and having a length of 6 mm in the lateral direction (TD direction) perpendicular to the MD direction is cut out from the cleaned separator 6, and the piece is assumed as the separator piece. Thereafter, using substantially the same method as the method described above, a radius of an arcuate shape formed by the separator 6 is calculated. When the separator piece is cut out from the cleaned separator 6, it is necessary to select a portion having neither wrinkles nor flaws on the separator 6 and to cut out the separator piece from such a portion.

In the first embodiment, a projecting amount W1 of the separator 6 from the end portion of the positive composite layer 42 in the X1 direction to the first end portion of the separator 6 is adjusted such that the projecting amount W1 becomes $r \cdot \cos^{-1}[1-(P/r)] + r \cdot \cos^{-1}[1-((P+n)/r)]$ or more. The projecting amount W1 is a length along the separator 6.

Figure 6:
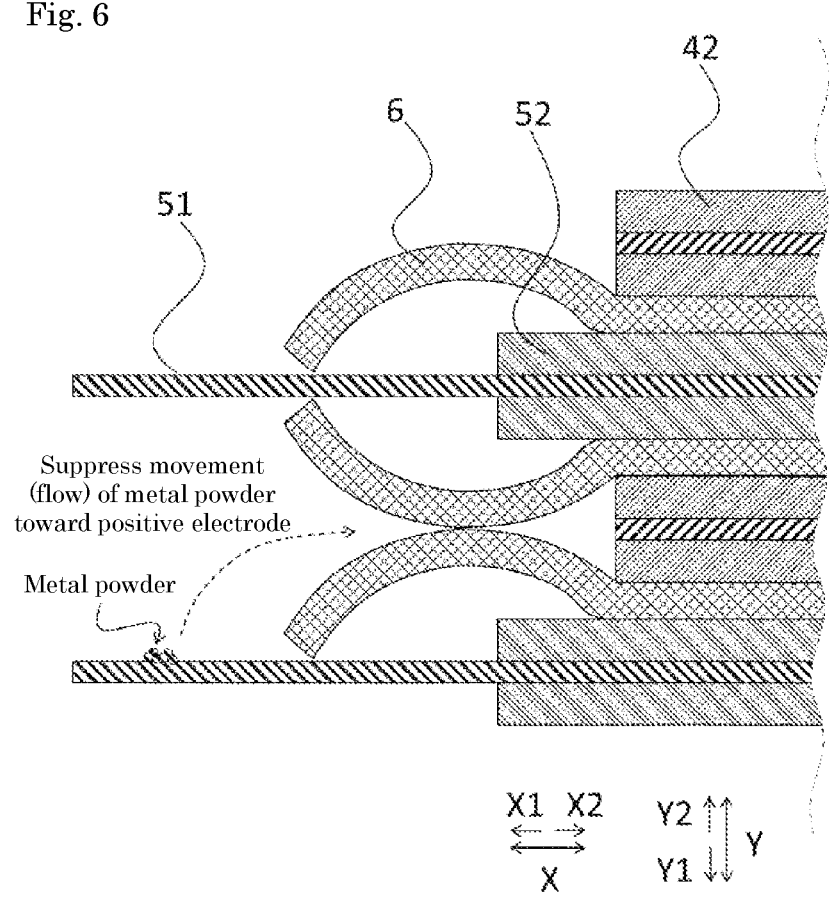
FIG. 6 is a cross-sectional view of a periphery of a negative composite layer non-forming portion of the energy storage element of the energy storage device according to the first embodiment taken along the X-Y plane.

In the first embodiment, by setting the projecting amount W1 of the separator 6 from the end portion of the positive composite layer 42 in the X1 direction to the first end portion of the separator 6 equal to or more than $r \cdot \cos^{-1}[1-(P/r)] + r \cdot \cos^{-1}[1-((P+n)/r)]$, as shown in FIG. 6, even when metal powder is mixed into the energy storage device due to a ordinarily unforeseeable cause, it is possible to suppress movement (flow) of metal powder to the positive electrode 4.

That is, as shown in FIG. 6, in the first embodiment, in the X1 direction (in a direction that the negative composite layer non-forming portion 51 projects), the first end portion of the separator 6 is made to project from the end portion of the positive composite layer 42 by a projecting amount W1 or more. The end portions (portions of the separators 6 in the vicinity of the first end portions of the separators 6) in the X1 direction of the separators 6 which face each other with the positive electrode 4 interposed therebetween respectively form an arcuate shape corresponding to a radius (r) intrinsic to the separator 6. With such a configuration, projecting portions of the respective arcuate shapes formed by the end portions of the separators 6 in the X1 direction are brought into contact with each other so that the end portion of the positive electrode 4 in the X1 direction is covered by the separators 6. That is, each separator 6 has a first bent portion having a recessed surface on a surface thereof which faces the negative electrode 5 at a portion projecting in the X1 direction from the positive composite layer 42, and the first bent portions of the separators 6 disposed adjacently to each other in the Y direction (a direction that the negative electrode 5, the separators 6 and the positive electrode 4 are stacked) are brought into contact with each other. As described above, a passage ranging from the negative composite layer non-forming portion 51 to the end portion of the positive electrode 4 in the X1 direction is closed and hence, even when the metal powder is mixed into the energy storage device due to a ordinarily unforeseeable cause, it is possible to suppress movement (flow) of the metal powder to the end portion of the positive electrode 4 in the X1 direction. Further, even when the metal powder is mixed into the energy storage device due to a ordinarily unforeseeable cause, it is possible to suppress movement (flow) of the metal powder to the end portion of the positive electrode 4 in the X1 direction and hence, it is possible to suppress lowering of a minute amount of capacity of the energy storage device 1.

Further, one end (first end portion) of the separator 6 in the X1 direction is brought into contact with a surface of the negative composite layer non-forming portion 51. With such a configuration, a passage ranging from an end portion of the negative electrode 5 to the positive electrode 4 can be closed.

Hereinafter, provisions of the projecting amount W1 of the separator 6 are described.

Figure 7:
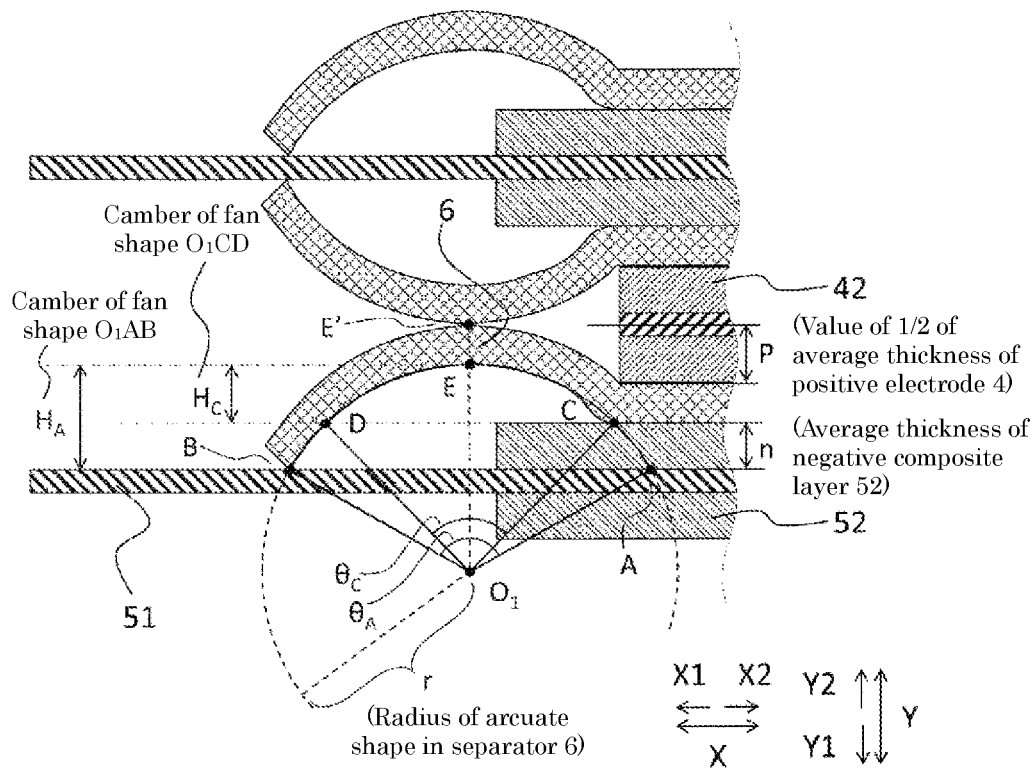
FIG. 7 is a view for describing the energy storage device according to the first embodiment.
Figure 8:
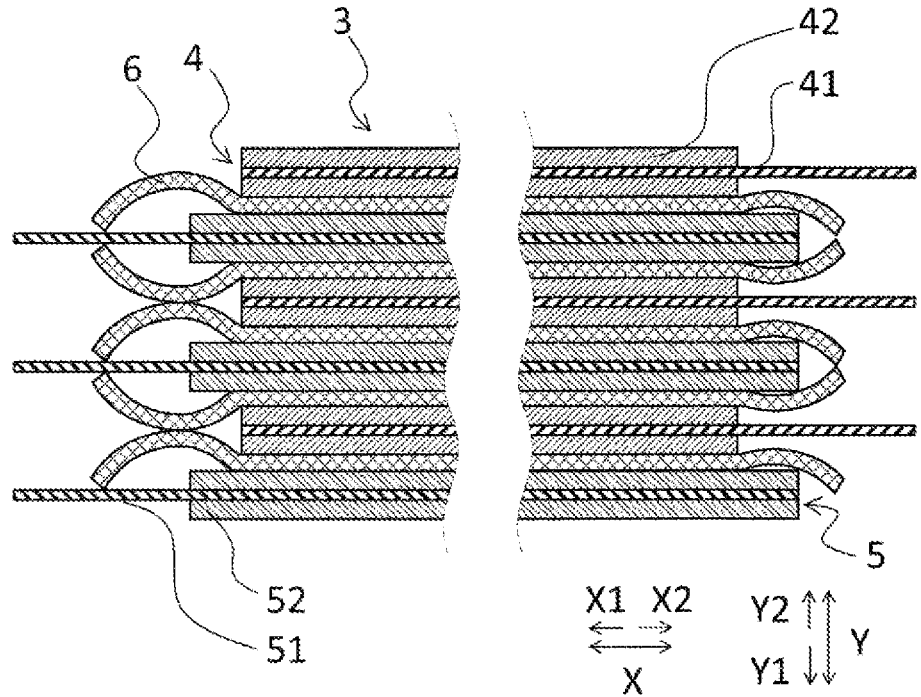
FIG. 8 is a cross-sectional view of an energy storage element of an energy storage device according to a second embodiment taken along an X-Y plane.

As shown in FIG. 7, a portion of each separator 6 in the X1 direction which projects from the end portion of the positive composite layer 42 forms an arcuate shape on the X-Y plane. In such a state, the center of a circle formed by the arcuate shape is set as $O_1$.

The portions of the separators 6 in the X1 direction which project from the end portion of the positive composite layer 42 respectively form an arcuate shape, and projecting portions of the respective portions each having an arcuate shape are brought into contact with each other. A contact point between the projecting portions is set as E'. A point which faces the point E' with the separator 6 (insulation layer 61 and the base material 62) interposed therebetween and is positioned on a negative-electrode side surface of the base material 61 is set as E.

A point which faces a point on a most X1 direction side in a portion of the separator 6 where the insulation layer 62 of the separator 6 is brought into contact with the positive composite layer 42 with the separator 6 interposed therebetween and is positioned on a negative-electrode-side surface of the base material 61 is set as C. A point at which a straight line passing the point C and extending in the X1 direction parallel to the X direction intersects the negative-electrode-side surface of the base material 61 of the separator 6 is set as D. A point at which the end portion of the base material 61 of the separator 6 in the X1 direction is brought into contact with the negative composite layer non-forming portion 51 is set as B. A point at which an extension of an arc BC toward an X2 direction side intersects the negative electrode current collecting foil is set as A.

A fan shape $O_1CD$ is formed by an arc CD, a straight line $O_1C$ (a radius of a circle $O_1$), and a straight line $O_1D$ (the radius of the circle $O_1$). A fan shape $O_1AB$ is formed by an arc AB, a straight line $O_1A$ (the radius of the circle $O_1$), and a straight line $O_1B$ (the radius of the circle $O_1$).

By setting a camber $H_A$ of the fan shape $O_1AB$ equal to the sum (P+n) of a thickness P which is a half of an average thickness of the positive electrode 4 and an average thickness n of the negative composite layer 52, with respect to the separators 6 which face each other with the positive electrode 4 interposed therebetween, projecting portions each having an arcuate shape are brought into contact with each other in the X1 direction of the end portion of the positive composite layer 42 and hence, a passage ranging from the negative composite layer non-forming portion 51 to the end portion of the positive electrode 41 in the X1 direction is closed. That is, in the first embodiment, by setting the projecting amount W1 of the separator 6 in the X1 direction from the end portion of the positive composite layer 42 such that the camber $H_A$ of the fan shape $O_1AB$ becomes the sum (P+n) of the thickness P which is a half of the average thickness of the positive electrode 4 and the average thickness n of the negative composite layer 52, the respective arcs are brought into contact with each other at the point E'. Further, when the camber $H_A$ of the fan shape $O_1AB$ is set larger than a value of P+n, a contact area between the respective arcs is increased and hence, it is possible to close the passage ranging from the negative composite layer non-forming portion 51 to the end portion of the positive electrode 4 in the X1 direction with more certainty.

That is, to acquire an advantageous effect of the present invention, it is necessary to set the projecting amount W1 of the separator 6 such that, with respect to the separators 6 which face each other with the positive electrode 4 interposed therebetween, portions of the separators 6 in the X1 direction which project from the end portion of the positive composite layer 42 and have an arcuate shape are brought into contact with each other at least at one point as in the case of the first embodiment. In this embodiment, although the description has been made with respect to a configuration in the Z direction on a certain X-Y plane, with respect to the above-mentioned contact portion, substantially the same configuration is provided also in other Z direction.

When the camber $H_A$ of the fan shape $O_1AB$ is equal to the sum of the thickness P which is a half of the average thickness of the positive electrode 4 and the average thickness n of the negative composite layer 52 ($H_A$=P+n), the projecting amount W1 of the separator 6 becomes equal to the sum of a half of the arc CD of the fan shape $O_1CD$ (that is, an arc CE) and a half of the arc AB of the fan shape $O_1AB$ (that is, an arc BE).

Generally, it has been known that a length (l) of an arc of a fan shape is expressed as a product of a center angle (θ) and a radius (r) (l=r·θ). As shown in FIG. 7, assuming a center angle of the fan shape $O_1CD$ as $θ_C$ and a center angle of the fan shape $O_1AB$ as $θ_A$, the half of the arc CD of the fan shape $O_1CD$ (that is, the arc CE) is expressed as (½)·(r·$θ_C$) and, in the same manner, the half of the arc AB of the fan shape $O_1AB$ (that is, the arc BE) is expressed as (½)·(r·$θ_A$).

The projecting amount W1 of the separator 6 becomes equal to the sum of the half of the arc CD of the fan shape $O_1CD$ (that is, the arc CE) and the half of the arc AB of the fan shape $O_1AB$ (that is, the arc BE) and hence, the relationship of W1=(½)·(r·$θ_C$)+(½)·(r·$θ_A$) is established.

Generally, it has been known that a camber (H) of a fan shape is expressed by using a center angle (θ) and a radius (r) (H=r·(1−cos(θ/2))). Further, when this formula is developed with respect to the center angle (θ), the relationship of θ=2 $cos^{-1}$(1−(H/r)) is established.

The camber $H_C$ of the fan shape $O_1CD$ is equal to the thickness P which is a half of the average thickness of the positive electrode 4 ($H_C$=P). That is, the center angle $θ_C$ of the fan shape $O_1CD$ is expressed as $θ_C$=2 $cos^{-1}$[1−(P/r)].

The camber $H_A$ of the fan shape $O_1AB$ is equal to the sum of the thickness P which is a half of the average thickness of the positive electrode 4 and the average thickness n of the negative composite layer 52 ($H_A$=P+n). That is, the center angle $θ_A$ of the fan shape $O_1AB$ is expressed as $θ_A$=2 $cos^{-1}$[1−((P+n)/r)].

The projecting amount W1 of the separator 6 is expressed as W1=(½)·(r·$θ_C$)+(½)·(r·$θ_A$) and hence, when the above-mentioned formulae are substituted for $θ_C$ and $θ_A$ respectively, a formula of $W_1$=r·$cos^{-1}$[1−(P/r)]+r·$cos^{-1}$[1−((P+n)/r)] can be derived.

That is, as in the case of the first embodiment, when the projecting amount W1 of the separator 6 satisfies the relationship of "$W_1$≥r·$cos^{-1}$[1−(P/r)]+r·$cos^{-1}$[1−((P+n)/r)]" so that, in the separators 6 which face each other with the positive electrode 4 interposed therebetween, portions of the separators 6 in the X1 direction projecting from the end portion of the positive composite layer 42 respectively form an arcuate shape, projecting portions of the arcuate shapes are brought into contact with each other and hence, the passage ranging from the negative composite layer non-forming portion 51 to the end portion of the positive electrode 4 in the X1 direction is closed. Accordingly, even when metal powder is mixed into the energy storage device due to a ordinarily unforeseeable cause and the metal powder is present in the vicinity of the negative composite layer non-forming portion 51 in the X1 direction, it is possible to suppress movement (flow) of the metal powder to the end portion of the positive electrode 4 in the X1 direction.

That is, in the first embodiment, the configuration is provided where, by defining the projecting amount W1 of the separator 6 in the X1 direction from the end portion of the positive composite layer 42 for every radius r of the separator 6, in the separators 6 which face each other with the positive electrode 4 interposed therebetween, portions of the separators 6 in the X1 direction which project from the end portion of the positive composite layer 42 respectively form an arcuate shape, and projecting portions of the arcuate shapes are brought into contact with each other. Hence, the end portion of the positive electrode 4 in the X1 direction is covered by such portions so that the passage ranging from the negative composite layer non-forming portion 51 to the end portion of the positive electrode 4 in the X1 direction is closed.

When the radius r of the separator 6 is extremely small, there is a possibility that an end portion in the X1 direction of the arcuate shape which the portion in the X1 direction of the separator 6 projecting from the end portion of the positive composite layer 42 forms is not brought into contact with the negative composite layer non-forming portion 51 and is brought into contact with the negative composite layer 52. However, in such a case, there is no tolerance in the projecting amount W1 of the separator 6 in the X1 direction from the end portion of the positive composite layer 42 and hence, in manufacturing the energy storage element 3, strict conditions (for example, when an energy storage element is manufactured by winding a positive electrode, a negative electrode and a separator, a control of a winding speed of these members, and a limitation of allowable winding deviation value) are required and hence, such a configuration is not preferable from a viewpoint of production efficiency.

<Second Embodiment>

The second aspect of the present invention is, in the first aspect of the present invention, directed to an energy storage device where a second end portion (other end portion) of the separator in the second direction projects from the positive composite layer, a projecting amount W2 of the separator from the positive composite layer to the second end portion of the separator satisfies a following formula (2).

$$W2 \geq r \cdot \sin^{-1}(a/2r) + r \cdot \cos^{-1}[\cos[\sin^{-1}(a/2r)] - (N/r)] \quad \text{formula (2)}$$

a: distance between edges of positive composite layer and negative composite layer in direction (second direction) that second end of separator projects N: value of ½ of average thickness of negative electrode r: radius of arc in TD direction (Y direction) of separator According to the second aspect of the present invention, even when metal powder is mixed into an energy storage device due to a ordinarily unforeseeable cause, the movement (the flow) of the metal powder to the positive electrode can be suppressed and hence, it is possible to suppress lowering of a minute amount of capacity caused by a minute short-circuit of the energy storage device attributed to the metal powder.

An energy storage device 100 according to a second embodiment is described with reference to FIG. 1 to FIG. 10.

In the second embodiment, the description has been made with respect to the energy storage device 100 where a projecting amount W2 of a separator 6 from an end portion of a positive composite layer 42 in an X2 direction to a second end portion of the separator 6 is defined. In the second embodiment, constitutional parts substantially equal to the corresponding constitutional parts of the first embodiment are given the same symbols, and their description is omitted.

Figure 10:
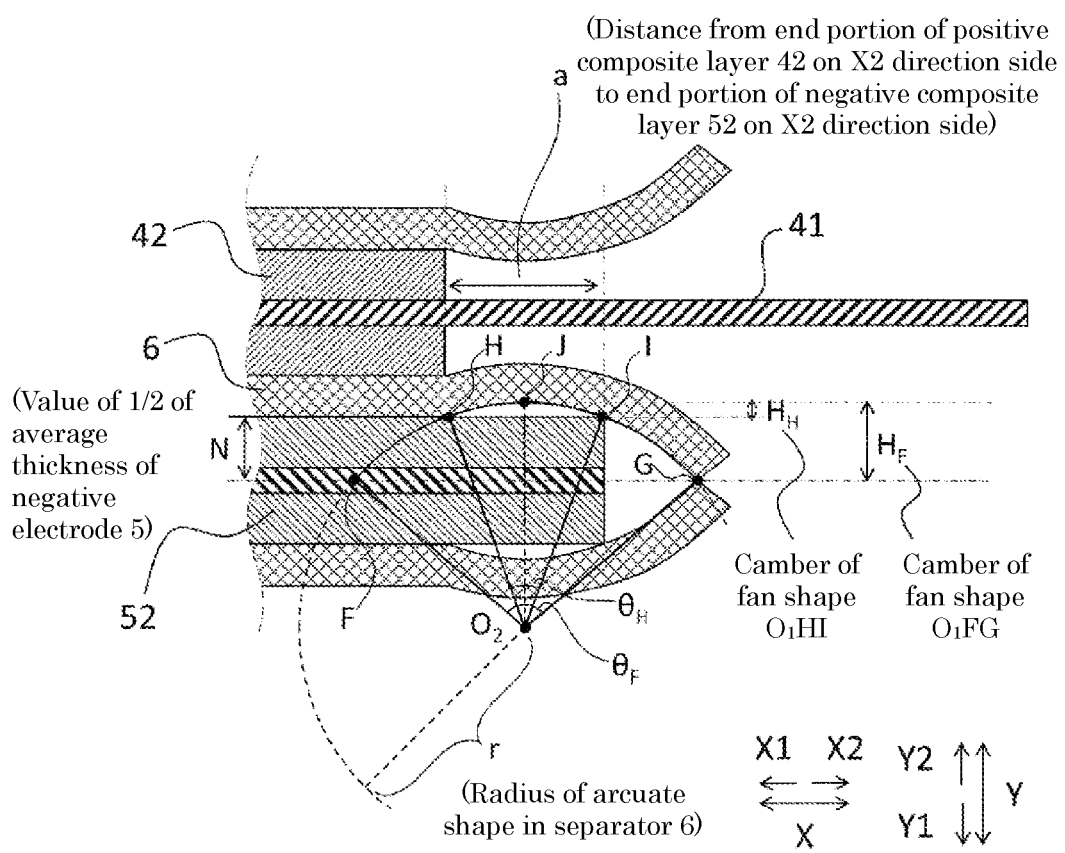
FIG. 10 is a view for describing the energy storage device according to the second embodiment.

A width in the Y direction of a portion of the negative electrode 5 where the negative composite layer non-forming portion 52 and the negative current collecting foil are made to overlap each other is an average thickness of the negative electrode 5, and a half of the average thickness of the negative electrode 5 is set as N (see FIG. 10). In a direction that the positive composite layer non-forming portion 41 projects (X2 direction), a distance from an end portion of the positive composite layer 42 to an end portion of the negative composite layer 52 is set as "a" (see FIG. 10).

Figure 9:
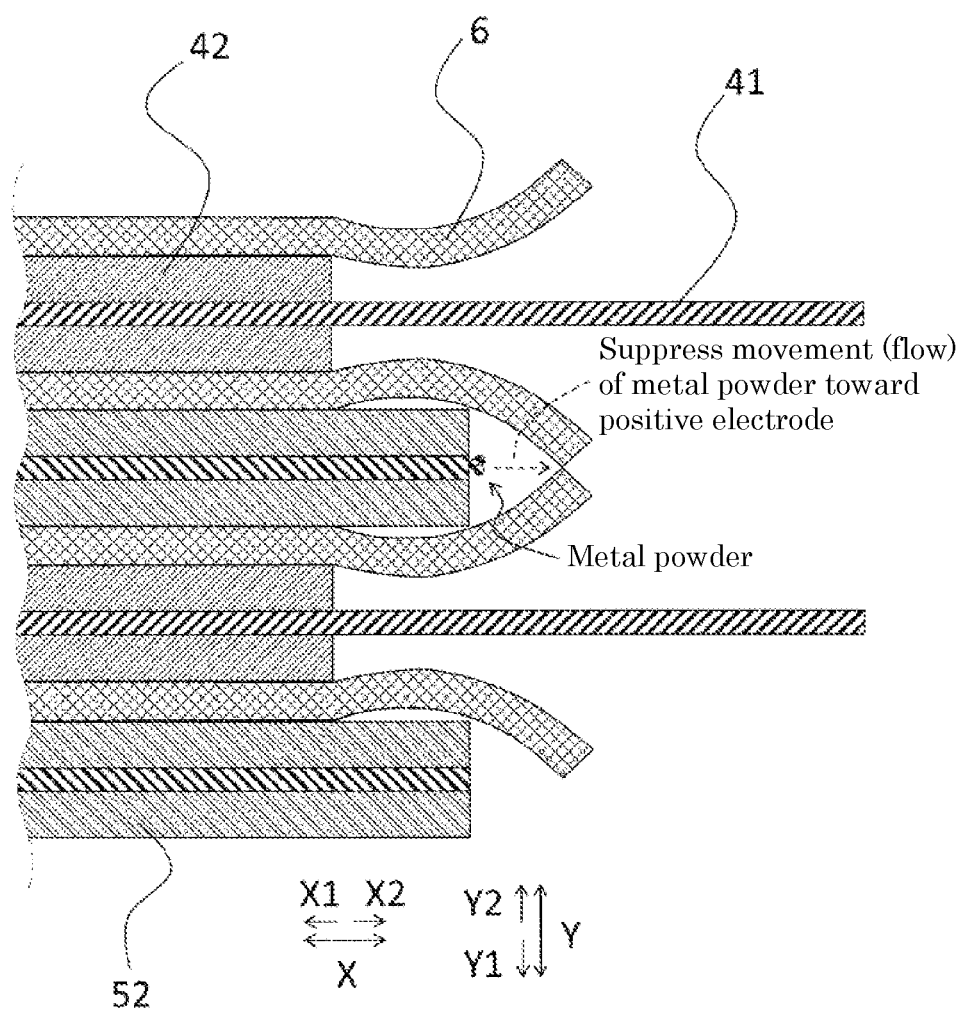
FIG. 9 is a cross-sectional view of a periphery of a positive composite layer non-forming portion of the energy storage element of the energy storage device according to the second embodiment taken along the X-Y plane.

As shown in FIG. 9, at an area in the vicinity of the end portion of the negative electrode 5 in the direction that the positive composite layer non-forming portion 41 projects (X2 direction), the end portion of the negative electrode current collecting foil is disposed at substantially the same position as the end portion of the negative composite layer 52 in the X direction.

When metal powder is mixed into the energy storage device due to a ordinarily unforeseeable cause and the metal powder is present in the vicinity of the end portion of the negative electrode 5 in the X2 direction, there is a possibility that the metal powder moves (flows) to the positive electrode 4 (particularly, to the positive composite layer non-forming portion 41 and an area in the vicinity of the end portion of the positive composite layer 42 in the X2 direction). Further, due to the movement (flow) of the metal powder to the positive electrode 4 (particularly, to the positive composite layer non-forming portion 41 and the area in the vicinity of the end portion of the positive composite layer 42 in the X2 direction), there is a possibility that lowering of a minute amount of capacity of the energy storage device 100 occurs attributed to the metal powder.

In the second embodiment, by setting a value of the projecting amount W2 of the separator 6 from the end portion of the positive composite layer 42 in the X2 direction to the second end portion of the separator 6 equal to or more than $r \cdot \sin^{-1}(a/2r) + r \cdot \cos^{-1}[\cos[\sin^{-1}(a/2r)] - (N/r)]$, even when metal powder is mixed into the energy storage device due to a ordinarily unforeseeable cause and the metal powder is present in the vicinity of the end portion of the negative electrode 5 in the X2 direction as shown in FIG. 9, it is possible to suppress the movement (flow) of the metal powder to the positive electrode 4. When a value of the projecting amount W2 of the separator 6 from the end portion of the positive composite layer 42 in the X2 direction to the second end portion of the separator 6 is set larger than $r \cdot \sin^{-1}(a/2r) + r \cdot \cos^{-1}[\cos[\sin^{-1}(a/2r)] - (N/r)]$, a contact area between the respective arcs is increased and hence, it is possible to close the passage ranging from the end portion of the negative electrode 5 on an X2 direction side to the positive electrode 4 with more certainty. The projecting amount W2 is a length along the separator 6.

That is, as shown in FIG. 9, in the second embodiment, in the X2 direction (in a direction that the positive composite layer non-forming portion 41 projects), the second end portion of the separator 6 is made to project from the end portion of the positive composite layer 42 by a projecting amount W2 or more. In the separators 6 which face each other with the positive electrode 4 interposed therebetween, portions of the separators 6 in the X2 direction which project from the end portion of the positive composite layer 42 respectively form an arcuate shape corresponding to a radius (r) intrinsic to the separator 6. With such a configuration, end portions of arcs in the X2 direction which are respectively formed by the end portions in the X2 direction of the separators 6 are brought into contact with each other and hence, a passage ranging from the end portion of the negative electrode 5 in the X2 direction to the positive electrode 4 is closed. With such a configuration, even when metal powder is present in the vicinity of the end portion of the negative electrode 5 in the X2 direction due to a ordinarily unforeseeable cause, it is possible to prevent movement (flow) of the metal powder to the positive electrode 4 and hence, it is possible to suppress lowering of capacity of the energy storage device 100 brought about by the metal powder.

Hereinafter, provisions of the projecting amount W2 of the separator 6 are described.

As shown in FIG. 10, a portion of each separator 6 in the X2 direction which projects from the end portion of the positive composite layer 42 forms an arcuate shape on the X-Y plane. That is, the second end portion of the separator 6 in the X2 direction is configured to project from the end portion of the positive composite layer 42, and has a second bent portion having a recessed surface on a surface thereof which faces the negative electrode 5 at a portion of the second end portion projecting in the X2 direction from the positive composite layer 42. In such a state, the center of a circle formed by the arcuate shape is set as $O_2$. The separator 6 is equal to the separator 6 used in the first embodiment and hence, the radius of the circle $O_1$ and a radius of the circle $O_2$ are equal to each other.

As shown in FIG. 10, the portions of the separators 6 in the X2 direction which project from the end portion of the positive composite layer 42 respectively form an arcuate shape and hence, end portions of the second end portions of the separators 6 which face each other with the negative electrode 5 interposed therebetween are brought into contact with each other. Such a contact point is set as G.

A point which faces a point on a most X2 direction side in a portion of the separator 6 where the insulation layer 62 of the separator 6 is brought into contact with the positive composite layer 42 with the separator 6 interposed therebetween and is positioned on a negative-electrode-side surface of the base material 61 is set as H. In the separator 6 which projects from the end portion of the positive composite layer 42 in the X2 direction, an arc HG is formed by a surface of the base material 61 which faces the negative composite layer 52, and a point at which an extension of the arc HG toward an X1 direction side intersects a straight line passing the point G and extending parallel to the X direction is set as F. A point at which a straight line passing the point H and extending parallel to the X direction intersects the arc which is formed by the surface of the base material 61 of the separator 6 in the X2 direction is set as I. Further, at the point I, the end portion of the negative composite layer 52 in the X2 direction and the base material 61 of the separator 6 are brought into contact with each other. A point at which a straight line passing the point $O_2$ and extending parallel to the Y direction intersects the arc which is formed by the surface of the base material 61 of the separator 6 is set as J.

A fan shape $O_2HI$ is formed by an arc HI, a straight line $O_2H$ (a radius of the circle $O_2$), and a straight line $O_2I$ (the radius of the circle $O_2$). A fan shape $O_2FG$ is formed by an arc FG, a straight line $O_2F$ (the radius of the circle $O_2$), and a straight line $O_2G$ (the radius of the circle $O_2$).

By setting a value obtained by subtracting a value of a camber $H_H$ of the fan shape $O_2HI$ from a value of a camber $H_F$ of the fan shape $O_2FG$ equal to a value N which is a half of an average thickness of the negative electrode 5, with respect to the separators 6 which face each other with the negative electrode 5 interposed therebetween, the end portions in the X2 direction each having an arcuate shape are brought into contact with each other in the X2 direction from the end portion of the positive composite layer 42 so that a passage ranging from the end portion of the negative electrode 5 in the X2 direction to the positive electrode 4 is closed. That is, in the second embodiment, by setting the projecting amount W2 of the separator 6 from the end portion of the positive composite layer 42 in the X2 direction such that a value obtained by subtracting a value of a camber $H_H$ of the fan shape $O_2HI$ from a value of a camber $H_F$ of the fan shape $O_2FG$ becomes N which is a half of an average thickness of the negative electrode 5, the respective arcs are brought into contact with each other at the point G. Further, when a value obtained by subtracting a value of the camber $H_H$ of the fan shape $O_2HI$ from a value of the camber $H_F$ of the fan shape $O_2FG$ is set larger than N which is the half of the average thickness of the negative electrode 5, a contact area between the respective arcs is increased and hence, the passage ranging from the end portion of the negative electrode 5 in the X2 direction to the positive electrode 4 can be closed with more certainly. In this embodiment, although the description has been made with respect to a configuration on a certain X-Y plane in the Z direction, with respect to the above-mentioned contact portion, substantially the same configuration is provided also in other Z direction.

When a value obtained by subtracting a value of the camber $H_H$ of the fan shape $O_2HI$ from a value of the camber $H_F$ of the fan shape $O_2FG$ is equal to N which is the half of the average thickness of the negative electrode 5 ($H_F-H_H=N$), the projecting amount W2 of the separator 6 becomes equal to the sum of a half of the arc HI of the fan shape $O_2HI$ (that is, the arc HJ) and a half of the arc FG of the fan shape $O_2FG$ (that is, the arc GJ).

Generally, it has been known that a length (l) of an arc of a fan shape is expressed as a product of a center angle ($\theta$) and a radius (r) ($l=r\cdot\theta$). As shown in FIG. 10, assuming a center angle of the fan shape $O_2HI$ as $\theta_H$ and a center angle of the fan shape $O_2FG$ as $\theta_F$, the half of the arc HI of the fan shape $O_2HI$ (that is, the arc HJ) is expressed as $(½)\cdot(r\cdot\theta_H)$ and, in the same manner, the half of the arc FG of the fan shape $O_2FG$ (that is, the arc FJ) is expressed as $(½)\cdot(r\cdot\theta_F)$.

The projecting amount W2 of the separator 6 becomes equal to the sum of the half of the arc HI of the fan shape $O_2HI$ (that is, the arc HJ) and the half of the arc FG of the fan shape $O_2FG$ (that is, the arc GJ) and hence, the relationship of $W2=(½)\cdot(r\cdot\theta_H)+(½)\cdot(r\cdot\theta_F)$ is established.

Generally, it has been known that a chord (d) of a fan shape is expressed by using a center angle ($\theta$) and a radius (r) ($d=2r\cdot\sin(\theta/2)$). Further, when this formula is developed with respect to the center angle ($\theta$), the relationship of $\theta=2\sin^{-1}(d/2r))$ is established.

The chord HI of the fan shape $O_2IH$ is equal to a distance "a" from the end portion of the positive composite layer 42 in the X2 direction to the end portion of the negative composite layer 52 (chord HI=a). That is, the center angle $\theta_H$ of the fan shape $O_2IH$ is expressed as $\theta_H=2\sin^{-1}(a/2r)$.

A camber $H_F$ of the fan shape $O_2FG$ is the sum of the thickness N which is a half of the average thickness of the negative electrode 5 and the camber $H_H$ of the fan shape $O_2HI$ ($H_F=N+H_H$). A center angle ($\theta$) of a fan shape is expressed as $\theta=2\cos^{-1}(1-(H/r))$ and hence, the center angle ($\theta_F$) of the fan shape $O_2FG$ is expressed as $\theta_F=2\cos^{-1}(1-(H_F/r))$. Further, when the center angle $\theta_F$ is obtained by substituting $H_F=N+H_H$ into the above-mentioned formula, the relationship of $\theta_F=2\cos^{-1}[1-(1/r)\cdot(N+H_H)]$ is established.

A camber (H) of a fan shape is expressed as $H=r\cdot(1-\cos(\theta/2))$ and hence, the camber $H_H$ of the fan shape $O_2HI$ is expressed as $H_H=r\cdot(1-\cos(\theta_H/2))$. Further, the center angle $\theta_H$ is expressed as $\theta_H=2\sin^{-1}(a/2r)$ and hence, the camber $H_H$ is expressed as $H_H=r\cdot(1-\cos[\sin^{-1}(a/2r)])$.

That is, when the center angle $\theta_F$ of the fan shape $O_2FG$ is obtained by substituting $H_H=r\cdot(1\cdot\cos[\sin^{-1}(a/2r)])$ into $\theta_F=2\cos^{-1}[1\cdot(1/r)\cdot(N+H_H)]$, the following relationship is established.

$$\begin{aligned}
\theta_F &= 2\cos^{-1}[1-(1/r)\cdot(N+H_H)] \\
&= 2\cos^{-1}[1-(N/r)-(1/r)H_H] \\
&= 2\cos^{-1}[1-(N/r)-(1/r)[r\cdot(1-\cos[\sin^{-1}(a/2r)])]] \\
&= 2\cos^{-1}[1-(N/r)-(1-\cos[\sin^{-1}(a/2r)])] \\
&= 2\cos^{-1}[-(N/r)+\cos[\sin^{-1}(a/2r)]]
\end{aligned}$$

-continued $$= 2\cos^{-1}[\cos[\sin^{-1}(a/2r)] - N/r]$$

From the above-mentioned relationship, the projecting amount W2 of the separator 6 is derived as follows.

$$W2 = (1/2) \cdot (r \cdot \theta_H) + (1/2) \cdot (r \cdot \theta_F)$$
$$= r \cdot \sin^{-1}(a/2r) + r \cdot \cos^{-1}[1 - (1/r) \cdot (N + H_H)]$$
$$= r \cdot \sin^{-1}(a/2r) + r \cdot \cos^{-1}[1 - (1/r) \cdot (N + r \cdot [1 - \cos(\theta_H/2)])]$$
$$= r \cdot \sin^{-1}(a/2r) + r \cdot \cos^{-1}[1 - (N/r) - [1 - \cos(\theta_H/2)]]$$
$$= r \cdot \sin^{-1}(a/2r) + r \cdot \cos^{-1}[\cos(\theta_H/2) - (N/r)]$$
$$= r \cdot \sin^{-1}(a/2r) + r \cdot \cos^{-1}[\cos[\sin^{-1}(a/2r)] - (N/r)]$$

That is, as in the case of the second embodiment, by setting the projecting amount W2 of the separator 6 to satisfy "W2≥r·sin$^{-1}$(a/2r)+r·cos$^{-1}$[cos [sin$^{-1}$(a/2r)]−(N/r)]", in the separators 6 which face each other with the negative electrode 5 interposed therebetween, portions of the separators 6 in the X2 direction which project from the end portion of the positive composite layer 42 respectively form an arcuate shape. In this case, end portions of the arcuate shapes in the X2 direction are brought into contact with each other so that the passage ranging from the end portion of the negative electrode 5 in the X2 direction to the positive electrode 4 (particularly, the positive composite layer non-forming portion 41 and an area in the vicinity of the end portion of the positive composite layer 42 in the X2 direction) is closed. Accordingly, even when metal powder is present in the vicinity of the end portion of the negative electrode 5 in the X2 direction due to an ordinarily unforeseeable cause, it is possible to suppress movement (flow) of the metal powder to the positive electrode 4.

That is, in the second embodiment, a configuration is provided where, by defining the projecting amount W2 of the separator 6 in the X2 direction from the end portion of the positive composite layer 42 for every radius (r) intrinsic to the separator 6, in the separators 6 which face each other with the negative electrode 5 interposed therebetween, portions of the separators 6 in the X2 direction which project from the end portion of the positive composite layer 42 respectively form an arcuate shape, and the end portions of the arcuate shapes in the X2 direction are brought into contact with each other. Hence, the end portion of the negative electrode 5 in the X2 direction is covered by such portions so that the passage ranging from the end portion of the negative electrode 5 in the X2 direction to the positive electrode 4 (particularly, the positive composite layer non-forming portion 41 and an area in the vicinity of the end portion of the positive composite layer 42 in the X2 direction) is closed.

<Third Embodiment>

The third aspect of the present invention is, in the energy storage device according to the first or the second aspect of the present invention, directed to an energy storage device where the projecting amount W1 of the separator from the end portion of the positive composite layer to the first end portion of the separator is greater than the projecting amount W2 of the separator from the end portion of the positive composite layer to the second end portion of the separator.

According to the third aspect of the present invention, it is possible to realize the reduction of cost of the energy storage device by decreasing an extra projecting amount of the separator and the high-energy density of an energy storage device by increasing a size of the positive composite layer and a size of the negative composite layer.

By setting the projecting amount W1 of the separator 6 in the X1 direction from the end portion of the positive composite layer 42 to the first end portion of the separator 6 equal to or more than r·cos$^{-1}$[1−(P/r)]+r·cos$^{-1}$[1−((P+n)/r)], the passage ranging from the negative composite layer non-forming portion 51 to the end portion of the positive electrode 4 in the X1 direction can be closed. By setting the projecting amount W2 of the separator 6 in the X2 direction from the end portion of the positive composite layer 42 to the second end portion of the separator 6 equal to or more than r·sin$^{-1}$(a/2r)+r·cos$^{-1}$[cos [sin$^{-1}$(a/2r)]−(N/r)], the passage ranging from the end portion of the negative electrode 5 in the X2 direction to the positive electrode 4 (particularly, the positive composite layer non-forming portion 41, and an area in the vicinity of the end portion of the positive composite layer 42 in the X2 direction) can be closed.

When a distance from the end portion of the positive composite layer 42 to the end portion of the negative composite layer 52 in the X2 direction is "a" and a distance from the end portion of the positive composite layer 42 to the end portion of the negative composite layer 52 in the X1 direction is "a" (a distance from the end portion of the positive composite 42 to the end portion of the negative composite layer 52 is equal in both the X1 direction and the X2 direction), the projecting amount W1 of the separator 6 becomes greater than the projecting amount W2 of the separator 6.

That is, by setting the projecting amount W1 of the separator 6 equal to or more than r·cos$^{-1}$[1−(P/r)]+r·cos$^{-1}$[1−((P+n)/r)], and by setting the projecting amount W2 of the separator 6 equal to or more than r·sin$^{-1}$(a/2r)+r·cos$^{-1}$[cos [sin$^{-1}$(a/2r)]−(N/r)], and by setting the projecting amount W1 greater than the projecting amount W2, it is possible to realize the reduction of cost of the energy storage device by decreasing an extra projecting amount of the separator and the high-energy density of an energy storage device by increasing a size of the positive composite layer and a size of the negative composite layer.

<Another Embodiment>

The techniques disclosed herein are not intended to be limited to the embodiments described above with reference to the drawings and, for example, the following configurations are also included in the technical scope.

In the above-mentioned embodiments, a case where the energy storage device 1, 100 is a lithium ion battery is exemplified. However, the present invention is not limited to such a case, and the energy storage device 1, 100 may be other secondary battery such as a nickel hydrogen battery or may be a primary battery. Further, the energy storage device 1, 100 may be a capacitor or the like.

In the above-mentioned embodiments, the energy storage element 3 of the energy storage device 1 is a winding-type energy storage element 3 which is formed into a flat shape by winding the positive electrode 4 and the negative electrode 5 with the separators 6 interposed therebetween. However, the present invention is not limited to such a configuration and, for example, the energy storage element 3 may be a stacking-type energy storage element which is formed by stacking the positive electrode 4 and the negative electrode 5 to each other with the separators 6 interposed therebetween. Further, in the above-mentioned embodiments, the energy storage device 1 includes one energy storage element 3. However, the present invention is not limited to such a configuration, the energy storage device 1 may include a plurality of energy storage elements 3.

Figure 11:
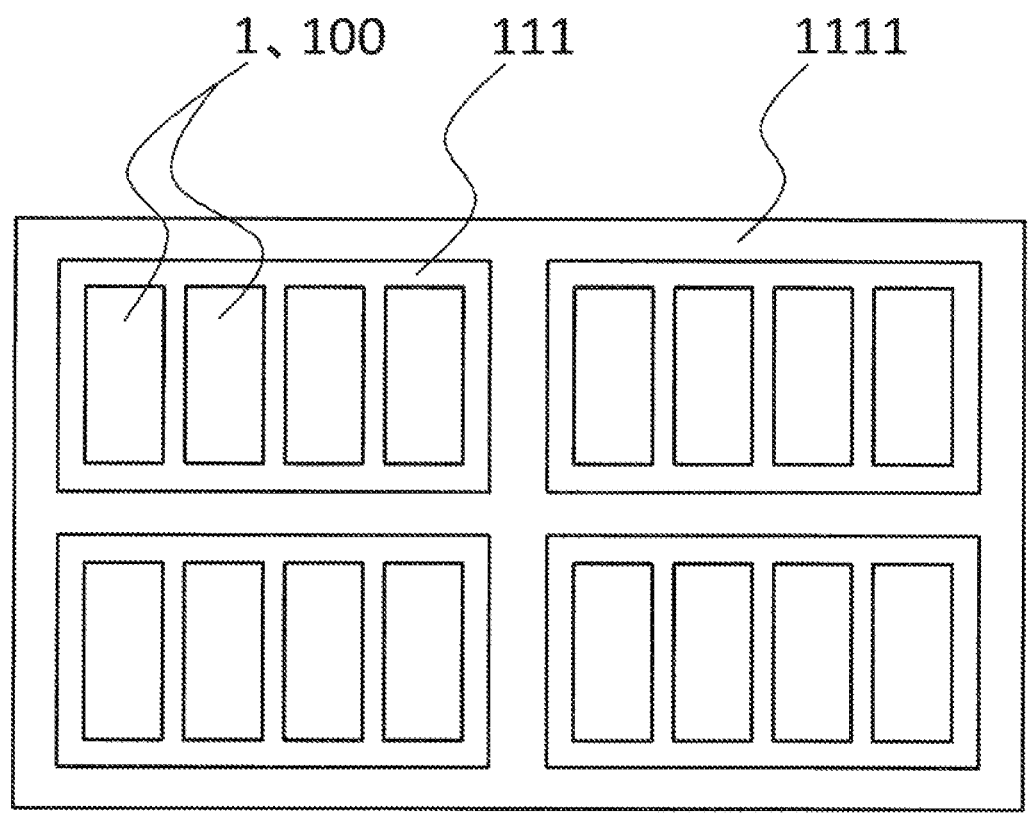
FIG. 11 is a view for describing an energy storage apparatus which includes a plurality of energy storage devices according to the embodiment.

Further, the present invention is also applicable to an energy storage apparatus including the plurality of energy storage devices. One embodiment of the energy storage apparatus is shown in FIG. 11. In FIG. 11, an energy storage apparatus 1111 includes a plurality of energy storage units 111. Each energy storage unit 111 includes the plurality of energy storage devices 1, 100. The energy storage apparatus 1111 can be mounted as a power source for automobile such as an electric vehicle (EV), a hybrid electric vehicle (HEV), a plug-in hybrid electric vehicle (PHEV). That is, the present invention is also applicable to an automobile equipped with the above-mentioned energy storage apparatus.

In the embodiments described herein, the projecting amount W1 or W2 of the separator is defined using a radius r of an arc which is formed by the separator such that the passage between the positive electrode and the negative electrode is closed. The embodiments described herein with reference to drawings disclose a configuration where the passage between the positive electrode and the negative electrode is completely closed. In an actual energy storage device, in a process of manufacturing the energy storage element, a slight positional deviation occurs among the positive electrode, the negative electrode and the separators and hence, a passage between the positive electrode and the negative electrode is not always completely closed. By defining a projecting amount of a separator based on a method of calculating a projecting amount of a separator according to the present invention, a tendency that a passage between a positive electrode and a negative electrode is closed is increased and hence, even when metal powder is mixed into an energy storage device due to a ordinarily unforeseeable cause, a possibility that the metal powder moves (flows) to the positive electrode can be decreased.

INDUSTRIAL APPLICABILITY

According to the present invention, it is possible to obtain an energy storage device which can suppress lowering of capacity and hence, the energy storage device can be effectively used in a power source for electric vehicle, a power source for electronic equipment, a power source for storing power and the like.

DESCRIPTION OF REFERENCE SIGNS

1, 100: energy storage device
111: energy storage unit
1111: energy storage apparatus
2: outer case
21: case body
22: lid body
3: energy storage element
4: positive electrode
41: positive composite layer non-forming portion
42: positive composite layer
5: negative electrode
51: negative composite layer non-forming portion
52: negative composite layer
6: separator
61: base material
62: insulation layer
7: positive electrode terminal
8: negative electrode terminal
9: positive electrode current collector
10: negative electrode current collector
11: (positive-electrode-use) clip
12: (negative-electrode-use) clip

The invention claimed is:

1. An energy storage device comprising:
a negative electrode including a negative composite layer and a composite layer non-forming portion on both surfaces of a negative electrode current collecting foil respectively;
a positive electrode including a positive composite layer on both surfaces of a positive electrode current collecting foil respectively; and
a separator including an insulation layer which is adjacent to the positive electrode and interposed between the negative electrode and the positive electrode, the insulation layer containing inorganic particles and a binder, wherein
the negative electrode, the separator and the positive electrode are stacked in a first direction,
the negative composite layer and the composite layer non-forming portion are disposed adjacently to each other in a second direction orthogonal to the first direction on the respective surfaces of the negative electrode,
the separator is configured to project in the second direction from the positive composite layer at one end of the separator in the second direction,
the separator contains a first bent portion including a recessed surface on a surface thereof which faces the negative electrode at a portion projecting in the second direction from the positive composite layer,
the first bent portions of the separators disposed adjacently to each other in the first direction are brought into contact with each other, and
a projecting amount W1 of the separator from the positive composite layer to one end of the separator satisfies a following formula (1)

$$W1 \geq r \cdot \cos^{-1}[1-(P/r)] + r \cdot \cos^{-1}[1-((P+n)/r)] \quad \text{formula (1)}$$

n: average thickness of negative composite layer
P: value of ½ of average thickness of positive electrode
r: radius of arc in second direction of separator.

2. An energy storage device comprising:
a negative electrode including a negative composite layer and a composite layer non-forming portion on both surfaces of a negative electrode current collecting foil respectively;
a positive electrode including a positive composite layer on both surfaces of a positive electrode current collecting foil respectively; and
a separator including an insulation layer which is adjacent to the positive electrode and interposed between the negative electrode and the positive electrode, the insulation layer containing inorganic particles and a binder, wherein
the negative electrode, the separator and the positive electrode are stacked in a first direction,
the negative composite layer and the composite layer non-forming portion are disposed adjacently to each other in a second direction orthogonal to the first direction on the respective surfaces of the negative electrode,
the separator is configured to project in the second direction from the positive composite layer at one end of the separator in the second direction,
the separator contains a first bent portion including a recessed surface on a surface thereof which faces the negative electrode at a portion projecting in the second direction from the positive composite layer, the first bent portions of the separators disposed adjacently to each other in the first direction are brought into contact with each other, and one end of the separator is brought into contact with a surface of the composite layer non-forming portion.

3. An energy storage device comprising:

a negative electrode including a negative composite layer and a composite layer non-forming portion on both surfaces of a negative electrode current collecting foil respectively;

a positive electrode including a positive composite layer on both surfaces of a positive electrode current collecting foil respectively; and a separator including an insulation layer which faces the positive electrode and interposed between the negative electrode and the positive electrode, wherein the negative electrode, the separator and the positive electrode are stacked in a first direction, the negative composite layer and the composite layer non-forming portion are disposed adjacently to each other in a second direction orthogonal to the first direction on the respective surfaces of the negative electrode, the separator is configured to project in the second direction from the positive composite layer at one end of the separator in the second direction, the separator contains a first bent portion including a recessed surface on a surface thereof which faces the negative electrode at a portion projecting in the second direction from the positive composite layer, the first bent portions of the separators disposed adjacently to each other in the first direction are brought into contact with each other, other end of the separator in the second direction is configured to project from the positive composite layer, and contains a second bent portion including a recessed surface on a surface thereof which faces the negative electrode at a portion of the other end projecting in the second direction from the positive composite layer, and projecting amount W1 of the separator from the positive composite layer to one end of the separator is larger than a projecting amount W2 of the separator from the positive composite layer to the other end of the separator.

4. The energy storage device according to claim 1, wherein the other end of the separator in the second direction is configured to project from the positive composite layer, and contains a second bent portion including a recessed surface on a surface thereof which faces the negative electrode at a portion of the other end projecting in the second direction from the positive composite layer.

5. The energy storage device according to claim 4, wherein a projecting amount W2 of the separator from the positive composite layer to the other end of the separator satisfies a following formula (2)

$$W2 \geq r \cdot \sin^{-1}(a/2r) + r \cdot \cos^{-1}[\cos[\sin^{-1}(a/2r)] - (N/r)] \quad \text{formula (2)}$$

a: distance between edges of positive composite layer and negative composite layer in a direction that the other end of separator projects N: value of ½ of average thickness of negative electrode r: radius of arc in second direction of separator.

6. The energy storage device according to claim 5, wherein the projecting amount W1 is larger than the projecting amount W2.

7. An energy storage apparatus comprising a plurality of energy storage devices described in claim 1.

8. An automobile comprising the energy storage apparatus according to claim 7.

9. The energy storage device according to claim 1, wherein one end of the separator is brought into contact with a surface of the composite layer non-forming portion.

10. The energy storage device according to claim 1, wherein the first bent portions of the separators disposed adjacently to each other in the first direction are brought into contact with each other without being adhered to each other.

11. The energy storage device according to claim 1, wherein the first bent portion has an arcuate shape.

* * * * *